United States Patent [19]
Fiedler

[11] Patent Number: 5,832,616
[45] Date of Patent: Nov. 10, 1998

[54] LENGTH MEASURING DEVICE AND METHOD OF MOUNTING A LENGTH MEASURING DEVICE

[75] Inventor: Karl Fiedler, Surberg, Germany

[73] Assignee: Dr. Johannes Heindenhain GmbH, Traunreut, Germany

[21] Appl. No.: 967,866

[22] Filed: Nov. 12, 1997

[30] Foreign Application Priority Data

Nov. 11, 1996 [DE] Germany .......................... 196 46 464.1
Mar. 21, 1997 [DE] Germany .......................... 197 11 753.8

[51] Int. Cl.⁶ .............................. G01B 7/14; G01B 11/14
[52] U.S. Cl. ................................................ 33/706; 33/702
[58] Field of Search .............................. 33/700, 702, 703, 33/704, 705, 706, 832

[56] References Cited

U.S. PATENT DOCUMENTS

| | | | |
|---|---|---|---|
| 4,198,757 | 4/1980 | Nelle et al. ................................ | 33/706 |
| 4,320,578 | 3/1982 | Ernst ......................................... | 33/706 |
| 4,554,741 | 11/1985 | Affa .......................................... | 33/702 |
| 4,843,729 | 7/1989 | Nagaoka et al. ........................... | 33/702 |
| 4,912,856 | 4/1990 | Ernst ......................................... | 33/707 |
| 4,991,311 | 2/1991 | Nagaola et al. ........................... | 33/708 |

FOREIGN PATENT DOCUMENTS 276 726  3/1990  German Dem. Rep. ................. 33/706

*Primary Examiner*—G. Bradley Bennett
*Attorney, Agent, or Firm*—Brinks Hofer Gilson & Lione

[57] ABSTRACT

A length measuring device and method for mounting the same is provided. A tube-shaped housing, which is sealed by mounting blocks attached at each end is fastened on an object by the mounting blocks. The mounting blocks have inserting elements with protrusions which interlockingly engage cutouts formed in the housing and, in this way, fix the housing in place in the measuring direction (X) with respect to the mounting blocks (5). The mounting blocks fasten the housing on an object in such a way that the housing undergoes the same thermal expansion and shrinkage as the object to which it is mounted.

19 Claims, 14 Drawing Sheets

LENGTH MEASURING DEVICE AND METHOD OF MOUNTING A LENGTH MEASURING DEVICE

FIELD OF THE INVENTION

The invention relates to a length measuring device and method for mounting a length measuring device so that the same expansions and contractions of an object to which the device is mounted due to changes in temperatures are also experienced by the device to increase the reliability of the measurements made by the device.

BACKGROUND OF THE INVENTION

A length measuring device of this type, on which the present invention is based, is described in U.S. Pat. No. 4,776,098, for example. The housing on which the scale is supported is sealed on both its faces by mounting blocks. The face of each one of these mounting blocks is fastened on the housing by screws oriented in parallel with the measuring direction. The mounting blocks are furthermore rigidly connected on a machine base by screws. The housing is made of a material whose coefficient of expansion differs from that of the machine base. When there are temperature changes, the housing undergoes a different longitudinal expansion than the machine base between the two mounting blocks. These longitudinal changes create a considerable tensile or compressive strain between the mounting block and the housing which must be absorbed by the screws inserted at the faces of the mounting blocks. Therefore the screws must be made relatively strong and heavy with the result that it is necessary to provide a relatively large amount of material on the housing for receiving the bore and the screw threads. The structural size of the length measuring device thus is relatively large.

A further length measuring device having mounting blocks arranged at the faces is described in U.S. Pat. No. 5,079,850. Securing of the mounting blocks is provided by pins inserted into continuous bores extending transversely with respect to the measuring direction. A disadvantage with such a mounting is that it is necessary to provide fits for the pins thereby making the removal of the mounting blocks difficult after the pins have been placed.

A further length measuring device is known from German Patent Publication No. DE 34 12 879 A1. A cover, which is connected with the housing by a holder, is respectively provided for sealing the faces of the tube-shaped housing. The holder consists of an element with a threaded bore extending in the measuring direction, and it is inserted into a milled cutout in the housing extending transversely to the measuring direction. Thereafter the cover is placed on the face and a screw is inserted in the front through a bore in the cover. The screw engages the threaded bore of the element, and the cover is pulled against the housing by tightening the screw. Fastening of the housing on the machine base takes place by fastening elements arranged independently of the cover which cooperate with the housing in the form of slideways. Viewed in the measuring direction, only one frictional connection is provided between the slideways and the housing. This connection does not assure reproducible measurements since in actual use the housing is displaced in relation to the slideways, particularly in case of temperature changes and vibrations.

SUMMARY OF THE INVENTION

It is an object of the invention to provide a length measuring device, whose face ends are sealed by mounting blocks, which is easy to manufacture and which provides accurate and reproducible position measurement.

It is a further object of the invention to provide a method for mounting a length measuring device which can be easily executed and which assures accurate and reproducible position measuring using a length measuring device.

Advantages of the invention lie particularly in the simple working of the front of the tube-shaped housing and simple mounting of the mounting blocks on the housing. Furthermore, the design of the length measuring device permits a simple change of the scanning unit by the quick removal of the mounting blocks. Following removal, the mounting blocks can again be simply and in a reproducible manner fastened on the housing. The length measuring device can be fastened on an object to be measured, for example a machine table, by the mounting blocks in such a way that its expansion behavior is identical with the expansion behavior of the object on which it is mounted.

Details and further advantages of the invention are described in the description of the drawings which follows.

DETAILED DESCRIPTION OF THE PRESENTLY PREFERRED EMBODIMENTS

Figure 1:
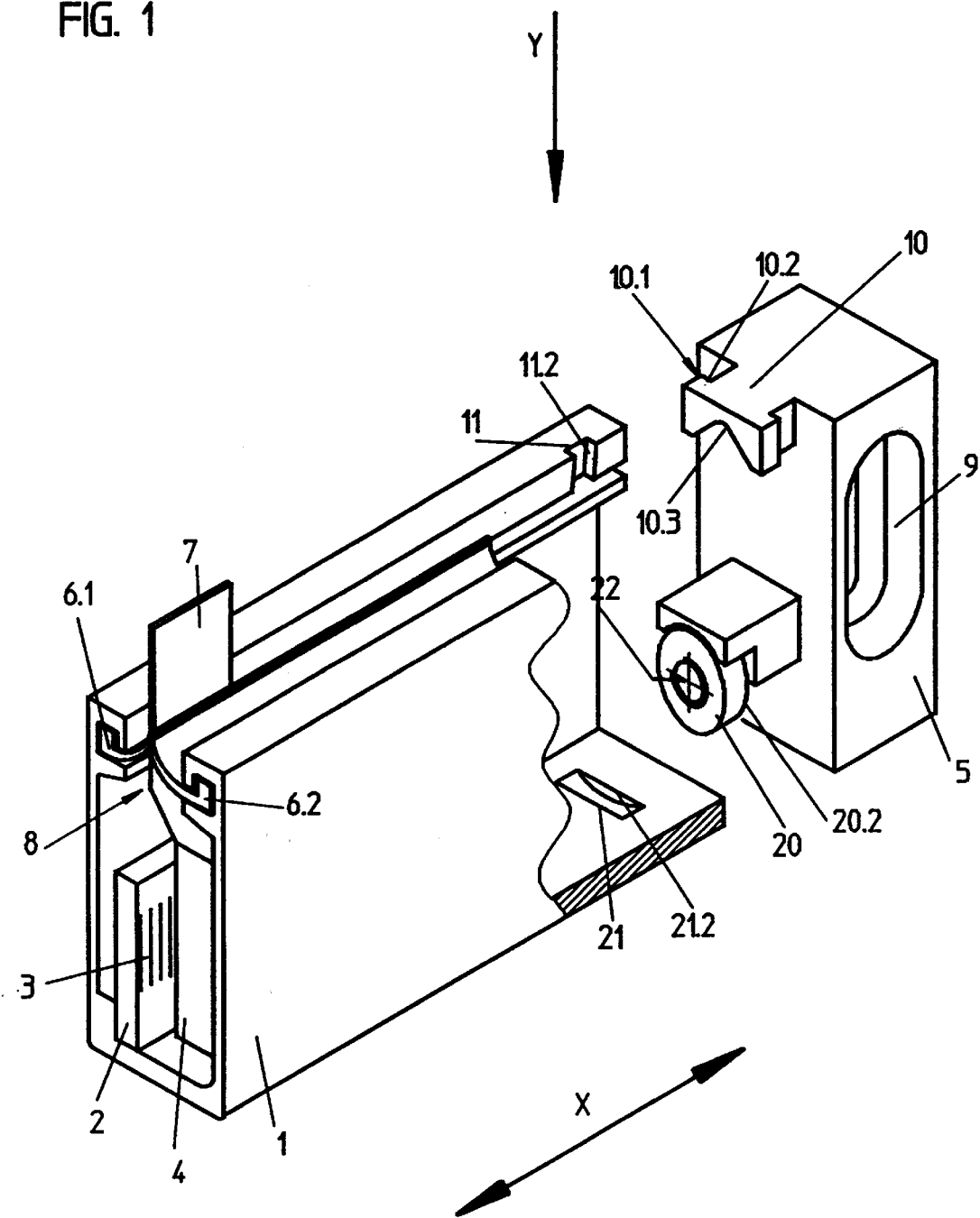
FIG. 1 is a schematic of a portion of a first length measuring device according to a preferred embodiment of the present invention.
Figure 2:
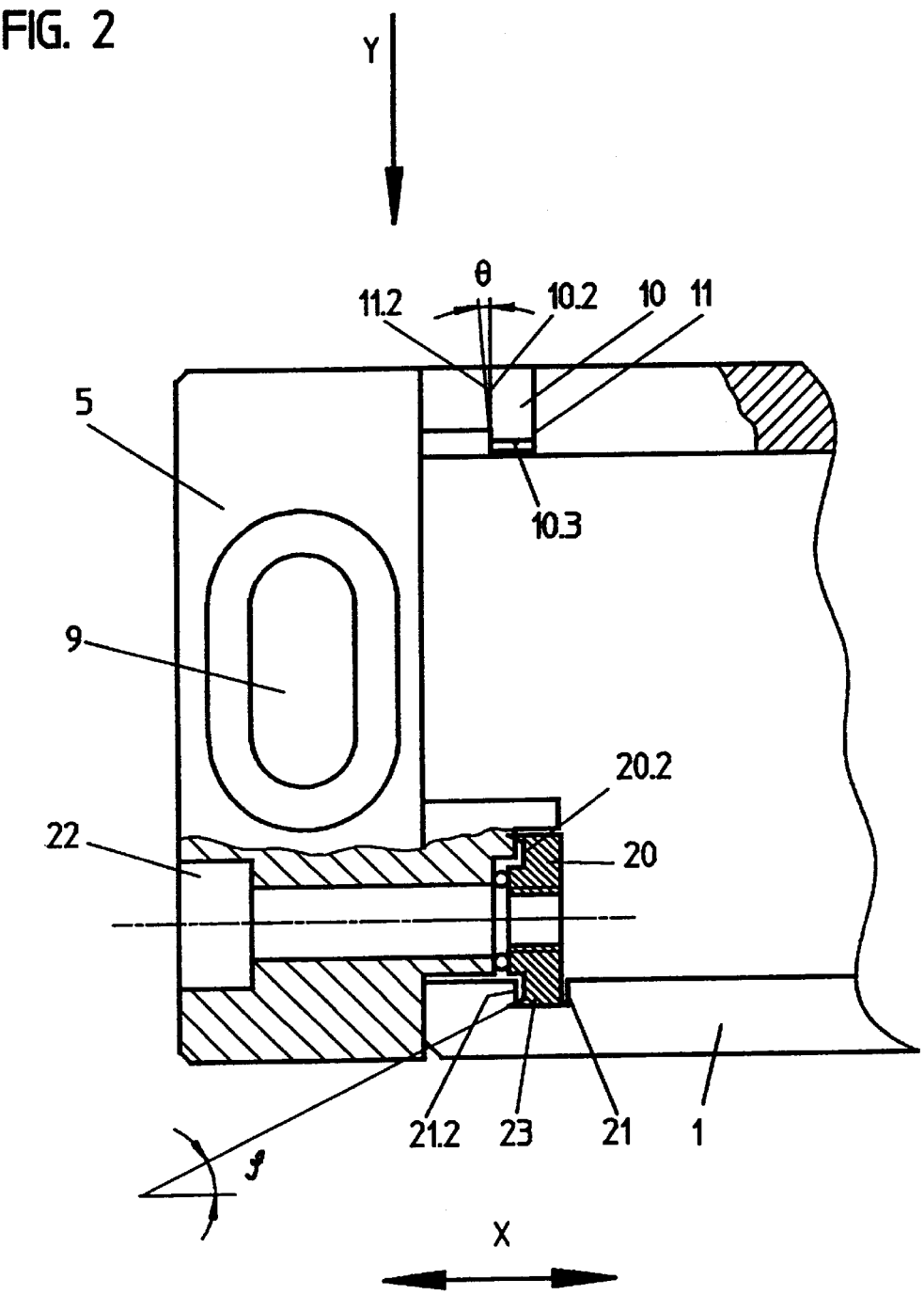
FIG. 2 is a cross-sectional view of the measuring device shown in FIG. 1.

FIG. 1 is a schematic of a portion of a first length measuring device according to a preferred embodiment of the present invention. FIG. 2 is a cross-sectional view of the measuring device shown in FIG. 1.

In a known manner the measuring device includes preferably a tube-shaped rectangular housing 1 preferably made of aluminum. A scale 2, for example made of glass or a glass-ceramic material, is fastened in the housing 1. The scale 2 has a graduation 3 formed thereon. The measuring device includes a scanning unit 4 located in the housing. The graduation 3 of the scale 2 is scanned by a scanning unit 4 during a measuring operation.

The housing 1 has a slit 8 extending along one side in the measuring direction X. A sealing element 6 formed by elastically springy sealing lips 6.1 and 6.2, which are arranged in a roof-like shape and rest on one another as shown, seals the interior of the housing in which resides the scale 3 and scanning unit 4 from the outside environment. A carrier 7 is coupled to the scanning unit 4 and extends through the sealing element 6.

For position measuring, the housing 1 is fastened by mounting blocks 5 on a first object as will be described in detail hereinafter, and the scanning unit 4 is fastened on a second object (not shown) by carrier 7. The graduation 3 can be an incremental graduation or an absolute graduation which, for example, is designed so it can be scanned photoelectrically, inductively, capacitively or magnetically.

The two face end openings of the housing 1 are respectively sealed by a mounting block 5. For reasons of clarity, only one of the mounting blocks 5 is represented in the preferred embodiments described hereafter. The end of the housing 1 not shown in the preferred embodiment is preferably sealed with an identical mounting block 5. The scale 2 and the scanning unit 4 are also not represented in the following preferred embodiments in order to clarify the invention.

A detailed description of the mounting block 5 according to a preferred embodiment will now ensue. The mounting block 5 has a mounting opening 9 through which fastening on one of the two objects, whose relative position is to be measured by the length measuring device, can take place. In the simplest case fastening is performed by a large dimensioned screw which is inserted through the mounting opening 9 of the mounting block 5 into a threaded bore of the first object.

The mounting block 5 has an inserting element 10 formed on the mounting block. In a preferred embodiment the inserting element 10 is a protrusion that points toward the front opening of the housing 1 having constrictions 10.1 at opposite ends. The housing 1 is correspondingly provided with a cutout 11 on each side only one of which is shown. This cutout 11 extends to a large degree vertically with respect to the measuring direction X and is a fitted guide for the inserting element 10 as will be described. The inserting element 10 interlockingly engages the housing 1 mounted on the cutout 11, as shown FIG. 2 which illustrates the mounting block. The constriction 10.1 of the inserting element 10 forms a surface 10.2 which extend substantially transversely with respect to the measuring direction X as does a surface 11.2 of the cutout 11. In the mounted state, the surfaces 10.2 and 11.2 interlockingly cooperate. The form closure of the inserting element 10 with the cutout 11 of the housing 1 arrests the mounting blocks in the measuring direction X in relation to the housing 1. The interlocking meshing assures that when the mounting blocks 5 have been mounted on the first object and to the housing 1, they cause the housing 1 to show the same expansion behavior as the first object during temperature changes, i.e., movement along the measuring direction X. Thus the housing 1 is matched to the longitudinal expansion and shrinkage of the first object, for example, a machine table made of cast iron.

Mounting of the mounting block 5 on the housing 1 is performed in connection with all the preferred embodiments of the invention by bringing the mounting block 5 to a face end of the housing 1 and by simply hooking the inserting element 10 into the cutout 11 by a relative vertical movement of the mounting block 5 with respect to the measuring direction X.

It is particularly advantageous if the cutouts 11 (only one of which is illustrated) have been cut into the profile of the housing 1 outside of the hollow space of the housing 1 sealed by the sealing elements 6. The inserting element 10 has surfaces 10.3, which are matched to the sealing elements 6, and in the mounted state these surfaces 10.3 are in contact with the sealing elements 6 and cause sealing in this area. The inserting element 10 can also cause clamping of the sealing element 6 in that the latter is pressed against surfaces of the housing 1 by the inserting element 10.

In a preferred embodiment at least one of the two surfaces 10.2 and 11.2 does not extend exactly at right angles with respect to the measuring direction X but is instead slightly inclined as can be seen in FIG. 2. In the example, the surface 11.2 of the housing 1 is slightly inclined in order to achieve a contact pressure acting transversely to the hooking movement between the face end surfaces of the housing 1 and the mounting block 5 in the course of hooking. More particularly, with reference to FIGS. 2 and 4 when the protrusion 10 hooks into the recess 11, the inner surface 10.2 slides on the slightly inclined surface 11.2 because of which a movement in the X-direction is unavoidably superimposed on the hooking movement which is predominately in the Y-direction because of the form closure. The angle of inclination of the surface 11.2 relative to the normal direction of the measuring direction X has been indicated by $\Theta$ and, in a preferred embodiment, is approximately 1°. The direction of the hooking movement during mounting of the mounting block 5 on the housing 1 is indicated by Y in FIGS. 1 and 2. In the course of this hooking movement the surface 10.2 is supported on the inclined surface 11.2, because of which the mounting block 5 is forced in the X direction against the end faces of the housing 1.

In a preferred embodiment, the mounting block has a second inserting element 20 that is fastened on the mounting block 5. This second inserting element 20 is also in the form of a protrusion which engages a cutout 21 formed in the housing 1. Similarly to the inserting element 10, the second inserting element 20 has a surface 20.2 as does the cutout 21 surface 21.2 which extend substantially transversely with respect to the measuring direction X to assure the interlocking arresting between the mounting block 5 and the housing 1 in the measuring direction X. In the preferred embodiment illustrated, the second inserting element 20 is in the shape of a disk which can be moved in the measuring direction X relative to the mounting block 5 by a screw 22. The two surfaces 20.2 and 21.2 are forced against each other by tightening the screw, and the surface 20.2 of the mounting block 5 is pulled against the surface 21.2 of the housing 1 as shown in FIG. 2.

The second inserting element 20 has a cupped gripping point 23 (see FIG. 2), which is pressed into the cutout 21 of the housing 1 and is supported on the mounting block 5. The cupped gripping point 23 also assures the secure arrestment of the mounting block 5 transversely to the measuring direction X. This arrestment is also an interlocked connection. The cupped gripping point 23 forms an angle $\beta$ with relation to the measuring direction X which has been selected to be such that in the course of tightening the screw 22 the mounting block 5 is forced into the correct position, i.e. downward in the Y direction and therefore also inevitably towards the housing 1 because of the angle β. In addition, the entry of the cupped gripping point 23 into the housing 1 and into the mounting block 5 causes an electrical contact between the housing 1 and the mounting block 5 which in a preferred embodiment are anodized.

In the following preferred embodiment and figures similar or similarly acting components will be identified by the same reference numerals as used in FIGS. 1 and 2.

Figure 3:
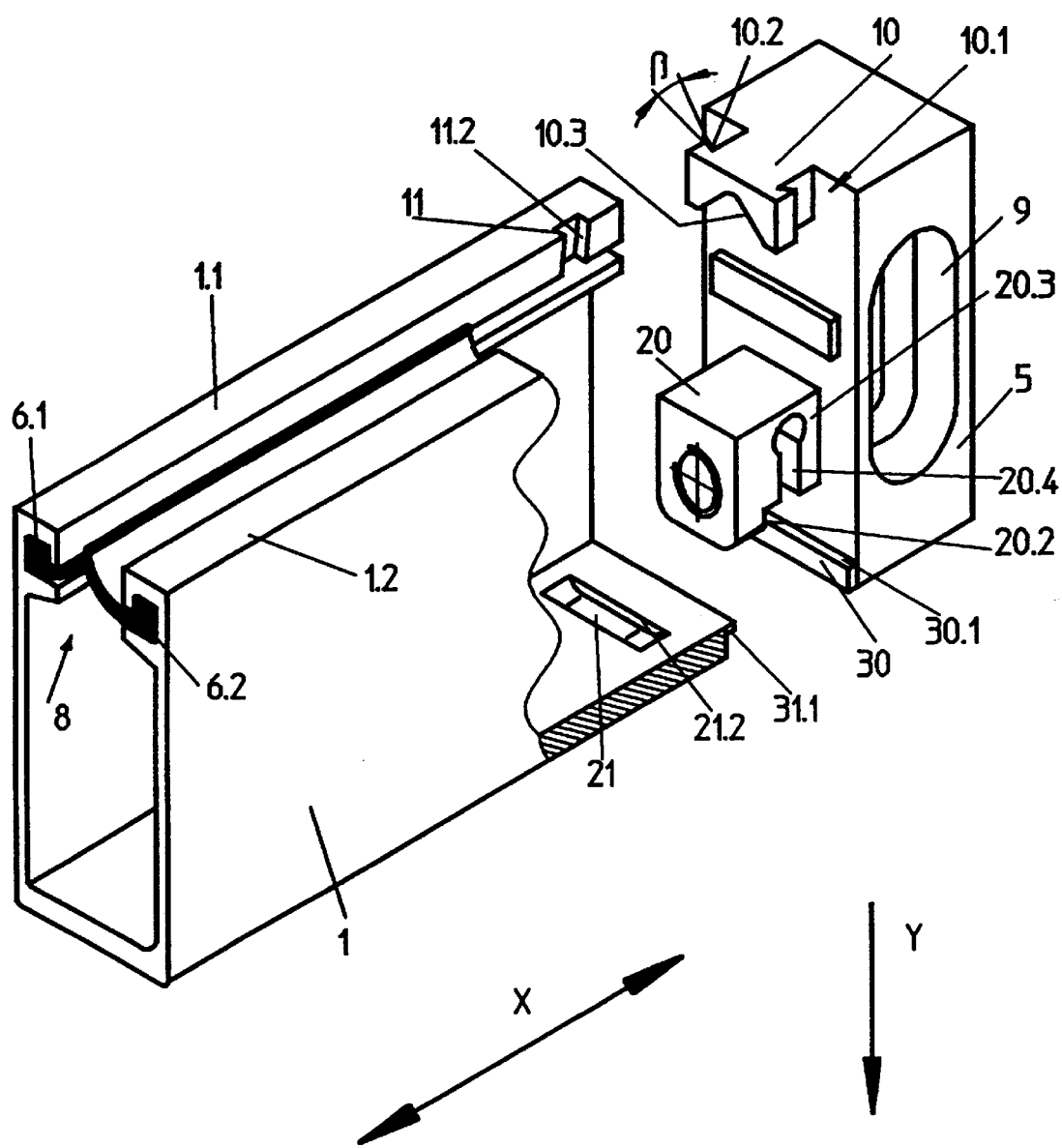
FIG. 3 is a schematic of a second length measuring device according to a preferred embodiment of the present invention.
Figure 4:
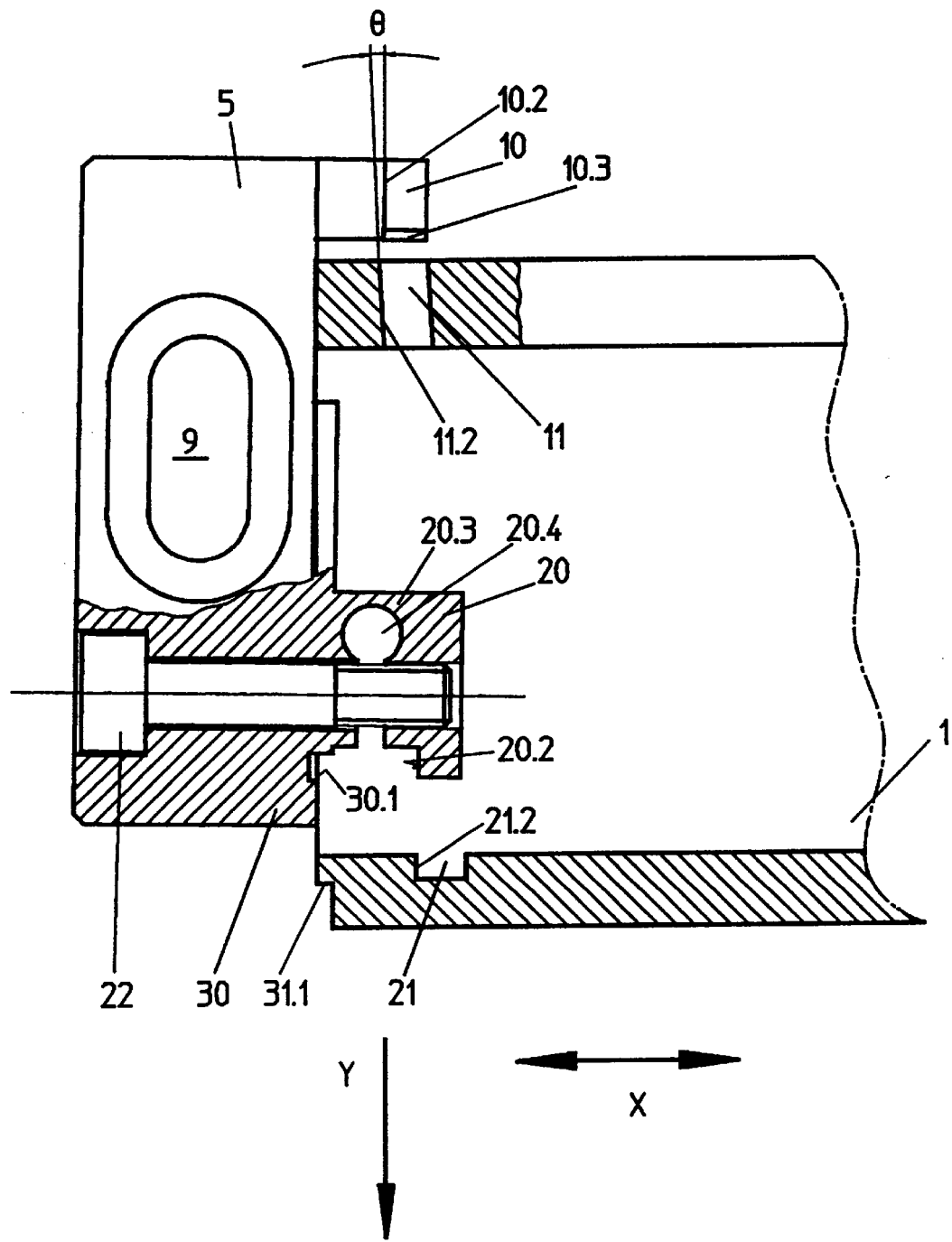
FIG. 4 is a cross-sectional view of the measuring device shown in FIG. 3 during mounting.
Figure 5:
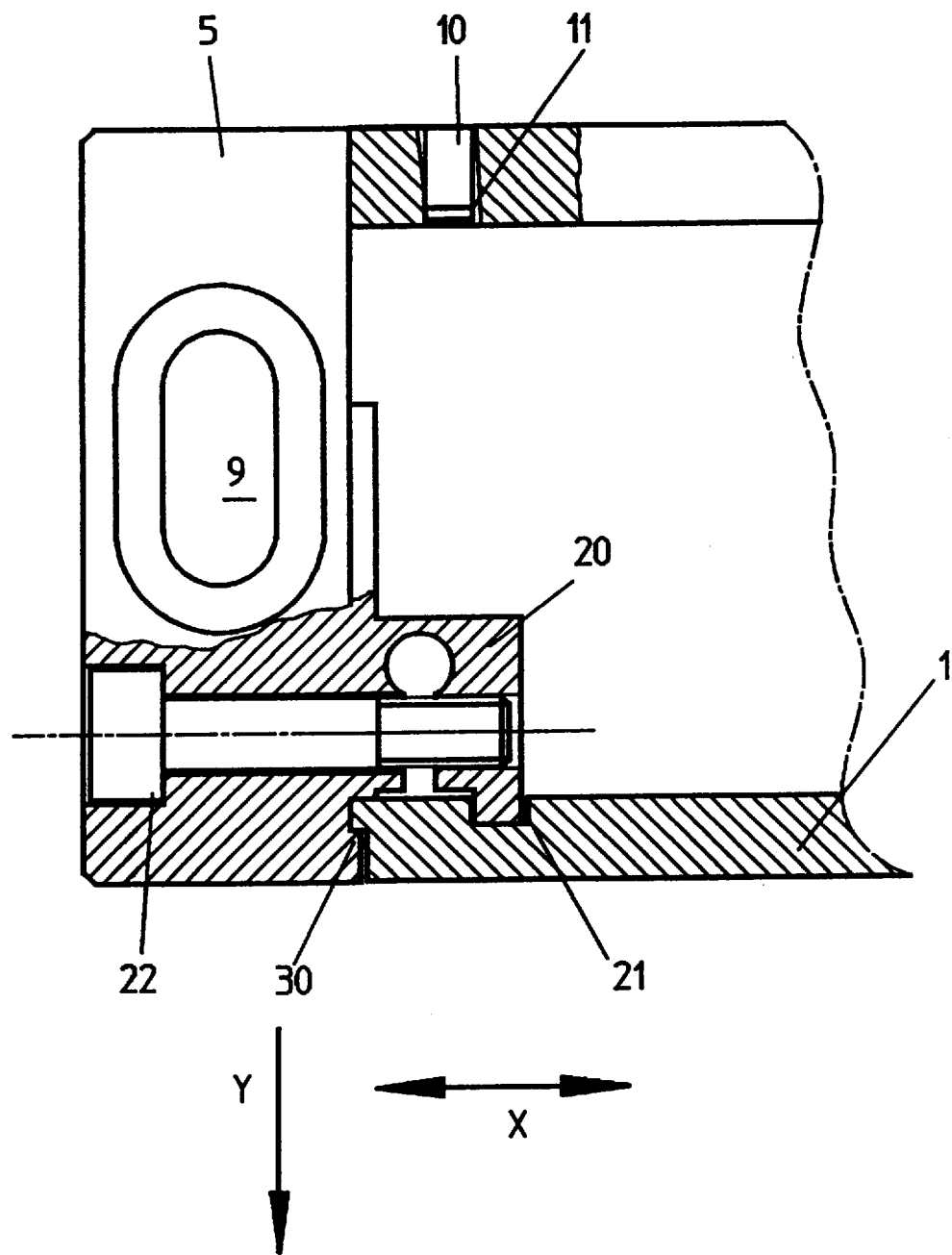
FIG. 5 is a cross-sectional view of the measuring device shown in FIG. 3 in a mounted state.

FIG. 3 is a schematic of a second length measuring device according to a preferred embodiment of the present invention. FIGS. 4 and 5 are cross-sectional views of the length measuring device shown in FIG. 3 during mounting and in a mounted state respectively. Again, a cutout 11 has been provided in the housing 1 for the interlocking reception of the inserting element 10. A difference between this preferred embodiment and that shown in FIGS. 1 and 2, is that the surfaces 10.2 of the inserting element 10 do not extend exactly vertically with respect to the direction X, but are slightly inclined. The angle of inclination is represented by β. This has the advantage that an interlocking connection is also provided between the mounting block 5 and the two legs 1.1 and 1.2 of the housing 1 which keeps the two legs 1.1 and 1.2 together. Spreading of the two legs 1.1 and 1.2 is prevented by the cooperation between the inclined surface 10.2 of the inserting element with the surfaces 11.2 of the cutouts 11 (only one of which is illustrated). The surface 11.2 can have the same angle of inclination β to assure a good interconnection.

In contrast to the first preferred embodiment shown in FIGS. 1 and 2, the second inserting element 20 is formed as one piece with the mounting block 5. The inserting element 20 can be displaced relative to the mounting block 5 in the measuring direction X by a hinge 20.3. The hinge 20.3 is formed by a weak point hinge, in that a slit 20.4 was cut between the mounting block 5 and the inserting element 20. In the course of mounting, the inserting element 20 engages the cutout 21 located on the housing 1, and the two surfaces 21.2 and 20.2 are forced against each other by the actuation of a screw 22. The two surfaces 21.2 and 20.2 constitute a form closure acting in the measuring direction X.

In addition, in this preferred embodiment a protrusion 30 is attached to, in particular formed on, the mounting block 5 which has a surface 30.1 extending transversely with respect to the direction Y. This surface 30.1 cooperates with a surface 31.1 of the housing 1 which also extends transversely with respect to the direction Y. In the mounted state these surfaces 30.1 and 31.1 constitute an interlocked connection acting opposite the direction Y. In this case the Y direction is the direction in which the mounting block 5 is moved with relation to the housing 1 during mounting in order to make possible the simple hooking of the inserting elements 10, 20 into the cutouts 11, 21. One position during this hooking process is represented in FIG. 4. FIG. 5 represents the mounting block 5 in its final mounted position.

Figure 6:
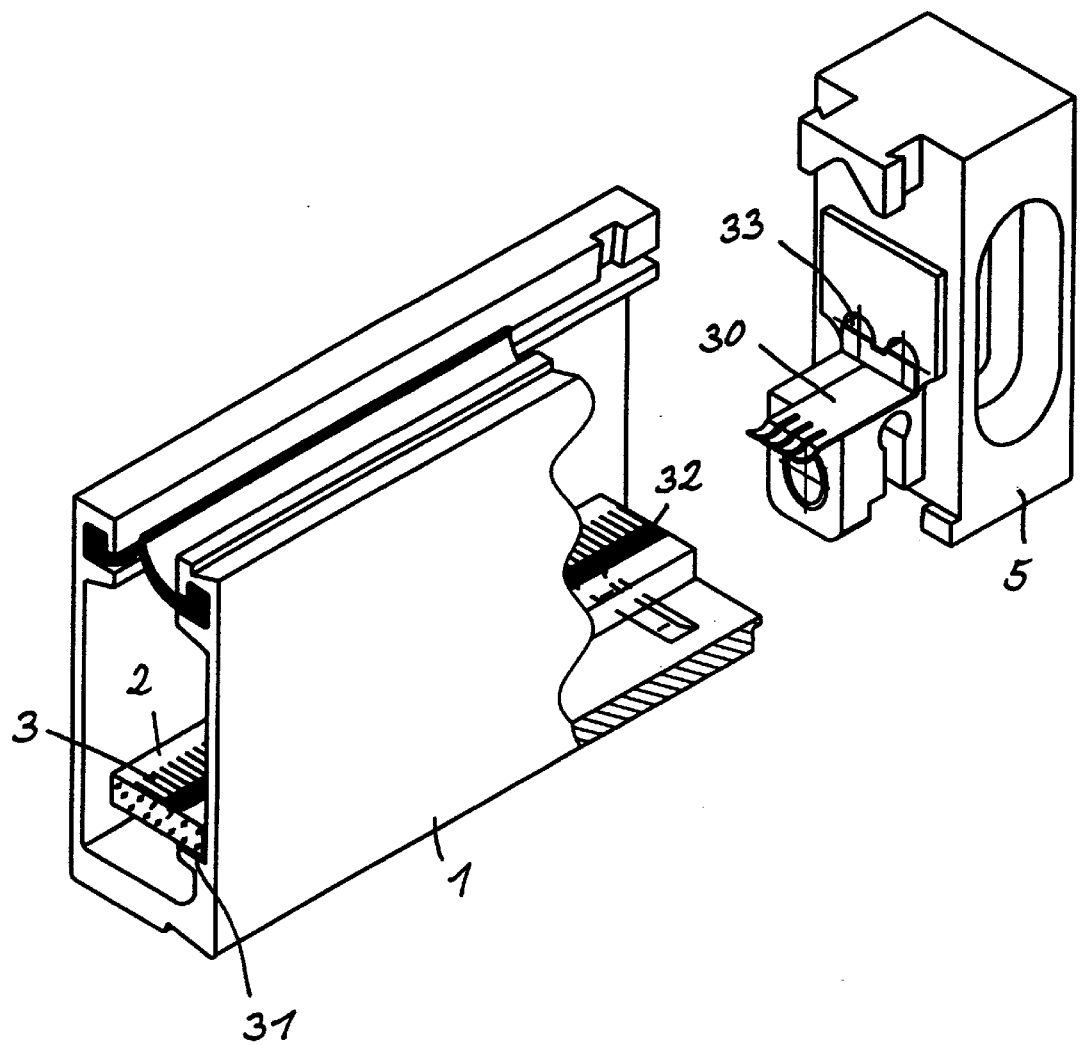
FIG. 6 is a schematic of the second length measuring device including a contact element.

FIG. 6 is a schematic of the second length measuring device including a contact element. Included in this embodiment is a contact element 30 which is fastened on the mounting block 5, which assures an electrically conducting connection between the scale 2 and the mounting block 5.

In general, the scale 2 is fastened by an elastic adhesive layer 31 on a surface of the housing 1. This adhesive layer 31 is electrically insulating. The scale 2 is made of glass or a glass-ceramic material and therefore is electrically insulated. The graduation 3, preferably made of chromium, is applied to a surface of the scale 2. In general, the scanning unit 4 (see FIG. 1) is resiliently supported on the surface of the scale 2 by ball bearings or sliding blocks. The surface of the scale 2 can become electrically charged by exterior electrical fields or by the rolling and sliding of the ball bearings, because of which a potential difference between this surface and other electrically conducting components of the length measuring device is created. This can lead to a pulse-like discharge. These discharges are superimposed on the electrical scanning signals, which in incremental measuring systems results in counting pulses and therefore counting errors or other signals interfering with the evaluation unit.

In order to discharge these electrical charges from the surface of the scale 2 over the entire length of the scale 2, a layer 32 preferably made of chromium is applied to the scale surface, which electrically connects the markings of the graduation 3 with each other. This electrically conductive layer 32 is electrically connected at least at one end of the scale 2 to the mounting block 5 by the contact element 30. The contact element 30 provides an electrical connection of the layer 32 with a reference potential, since the electrically conducting mounting block 5 is fastened in an electrically conducting manner on a machine element which, in turn, is connected with a reference potential (ground). In order to make a connection of good electrical conductivity between the scale 2 and the mounting block 5 which is preferably made of aluminum, it is necessary to have the contact element 30 make contact with the mounting block 5 in a non-anodized area. To this end a bore 33, for example, is cut into the mounting block 5 into which the contact element 30 is pressed. A mechanical as well as an electrically conducting connection is created by this pressing, since the insulating anodized layer is nicked in the bore 33. More particularly, in a preferred embodiment the contact element 30 is a stamped sheet metal piece with sharp edges. These sharp edges scratch the insulating layer of the aluminum when being pressed into the bore 33 and in this way provides an electrical contact. The contact element 30 can also be fastened to the mounting block 5 by screws or rivets.

In a preferred embodiment, the contact element 30 is a simple sheet metal element made of an electrically conducting material which, in its mounted state on the mounting block 5, is resiliently supported on a surface of the layer 32.

The use of a contact element 30 can be particularly advantageously employed in connection with electrically non-conducting scales 2. If the scale 2 consists of an electrically conducting material and is fastened in an electrically insulated manner on the housing 1, the contact element 30 can also be advantageously employed by connecting the scale 2 with the mounting block 5 in an electrically conducting manner.

The incorporation of a contact element with a mounting block 5 can be used with all of the preferred embodiments of the invention.

Figure 7:
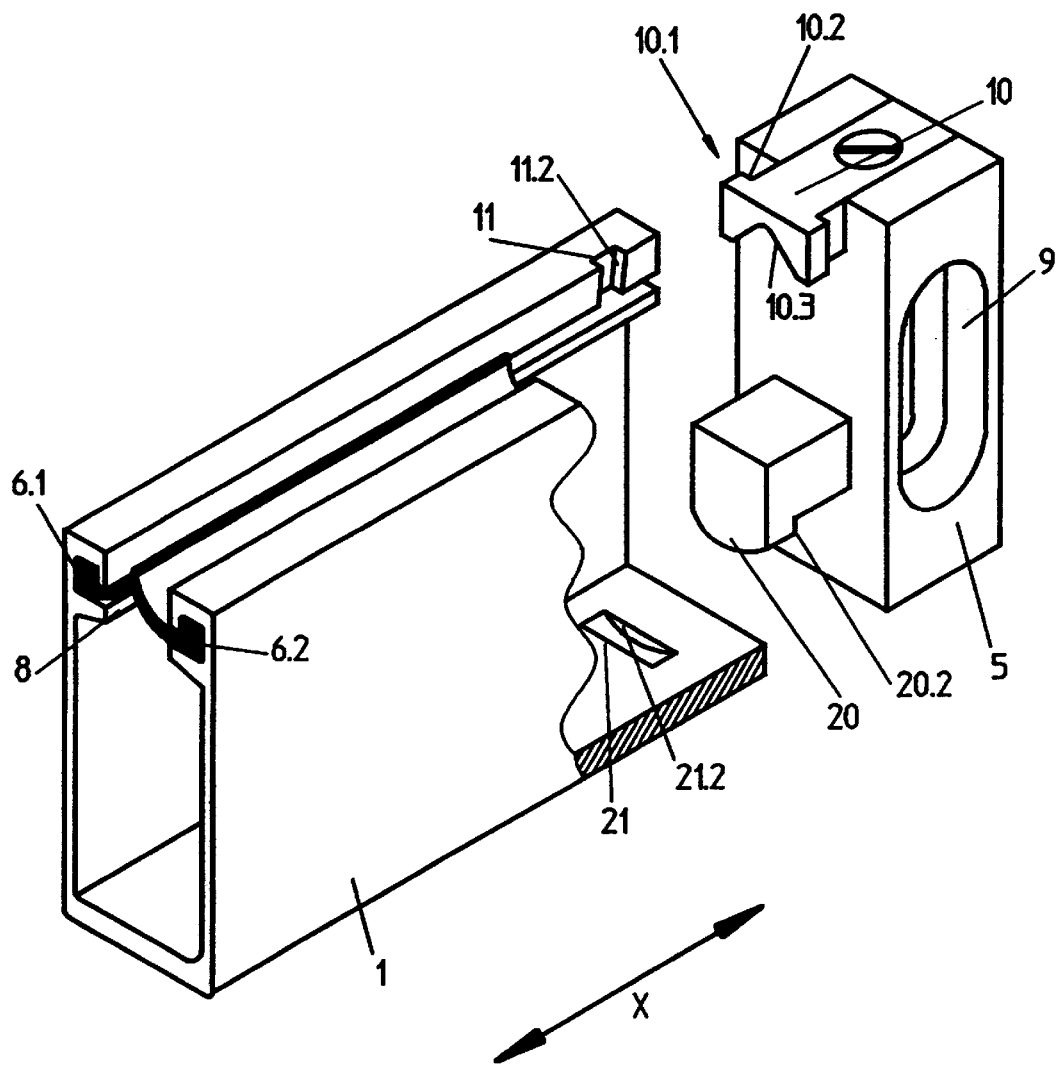
FIG. 7 is a schematic of a portion of a third length measuring device according to a preferred embodiment of the present invention.
Figure 8:
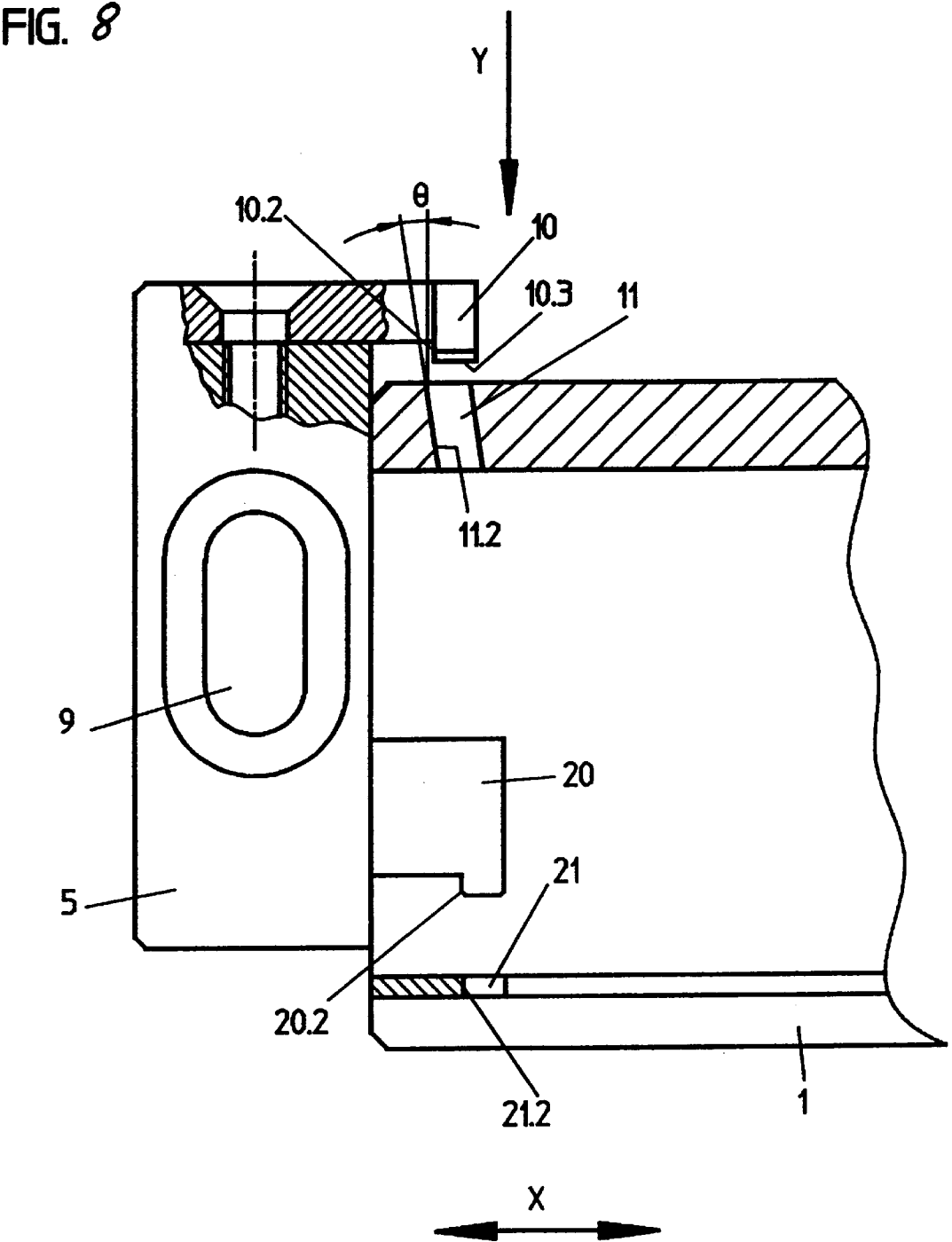
FIG. 8 is a cross-sectional view of the measuring device shown in FIG. 7.

FIG. 7 is a schematic of a portion of a third length measuring device according to a preferred embodiment of the present invention. FIG. 8 is a cross-sectional view of the device shown in FIG. 7. In this preferred embodiment the inserting element 10 is screwed to the mounting block 5. The second inserting element 20 is formed as one piece on the mounting block 5 and has a protrusion, which engages the cutout 21, also formed as one piece on the mounting block 5. The shape of the inserting element 10 and cutout 11 corresponds to that of the first preferred embodiment and thus need not be described again in detail.

Figure 9:
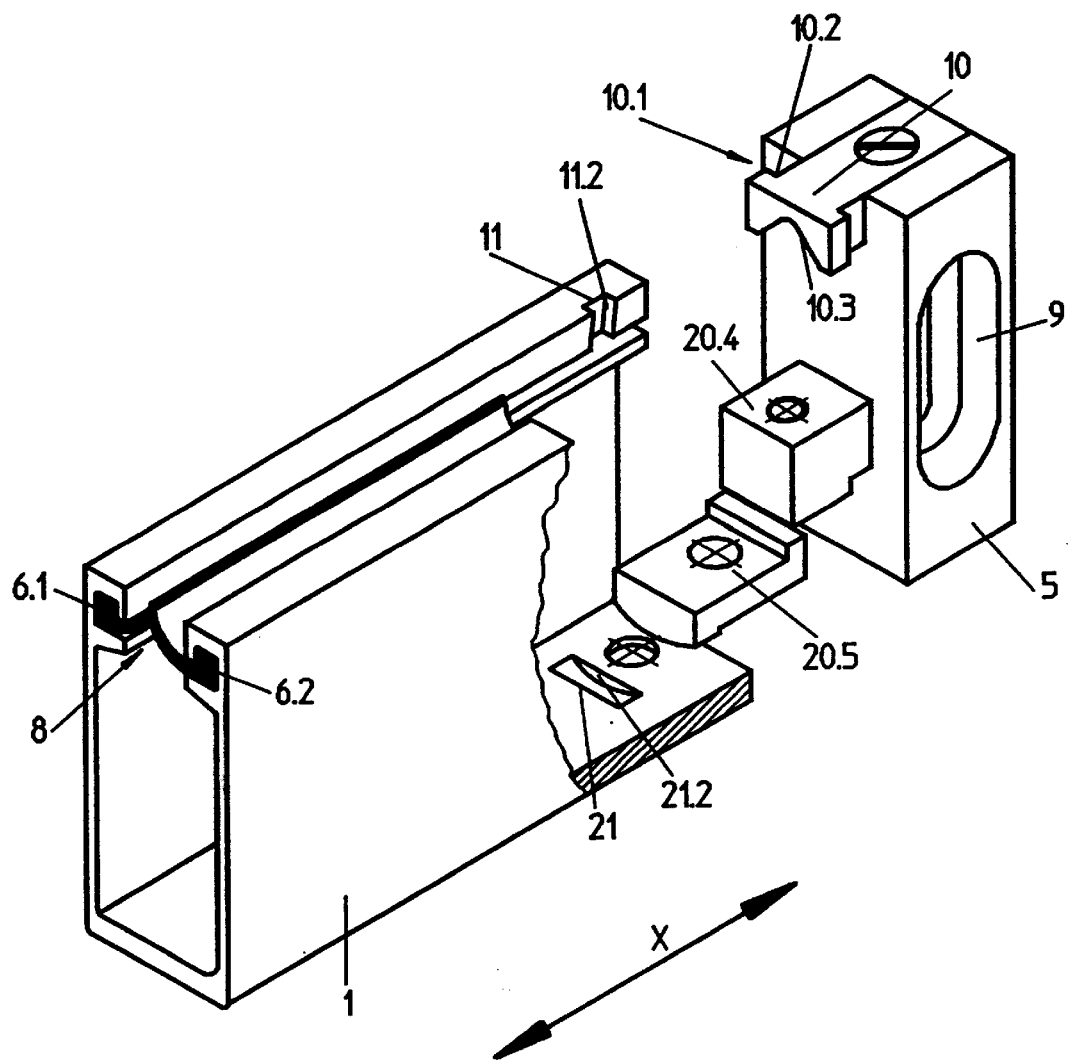
FIG. 9 is a schematic of a portion of a fourth length measuring device according to a preferred embodiment of the present invention.
Figure 10:
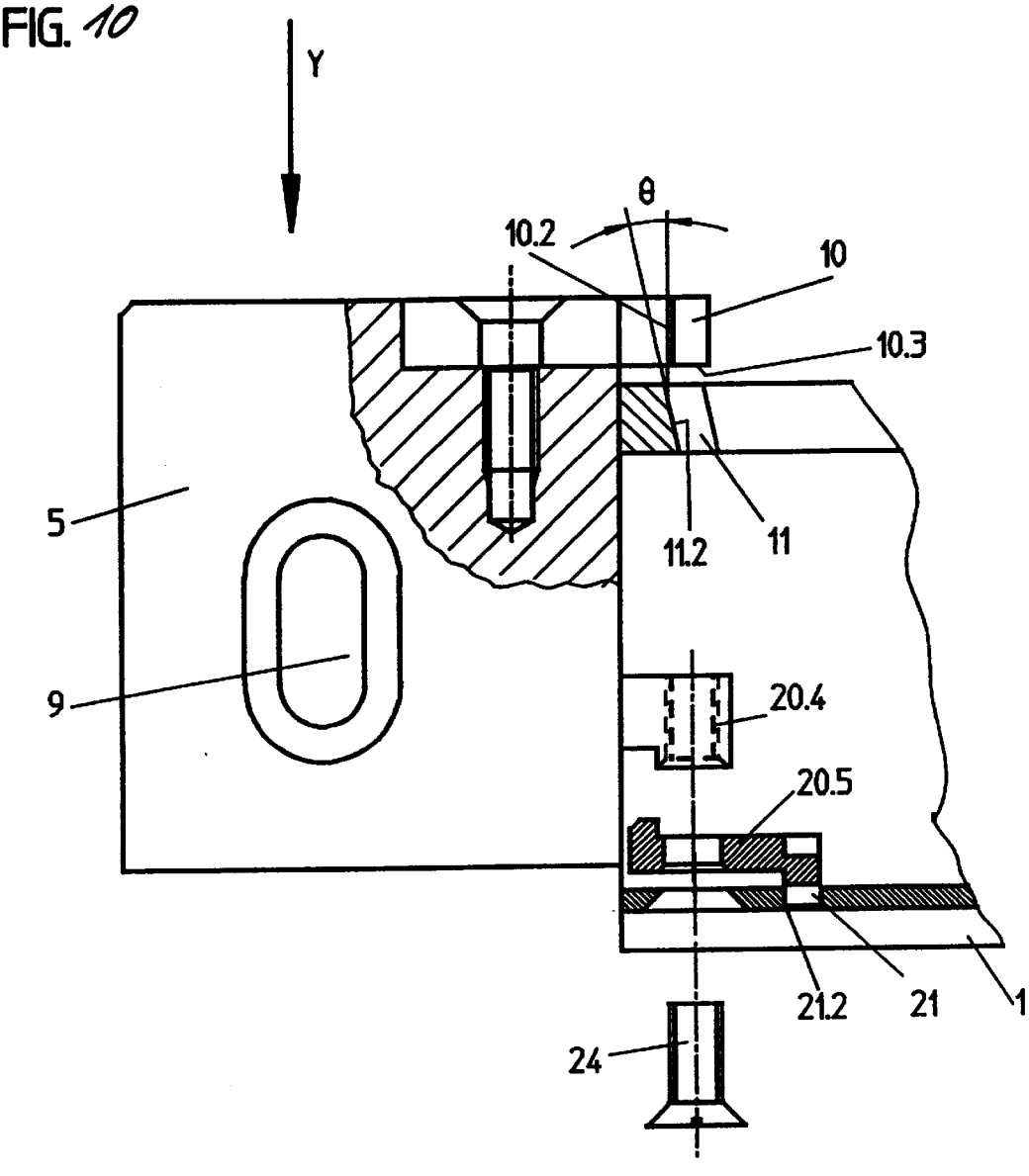
FIG. 10 is a cross-sectional view of the fourth length measuring device shown in FIG. 9.

FIG. 9 is a schematic of a portion of a fourth length measuring device according to a preferred embodiment of the present invention. FIG. 10 is a cross-sectional view of the device shown in FIG. 9. Like the mounting block shown in FIGS. 7 and 8, the inserting element 10 is screwed to the mounting block 5 and otherwise is embodied the same as in the first preferred embodiment shown in FIGS. 1 and 2. The second inserting element 20 is preferably made of several parts. A first part 20.4 is formed on the mounting block 5. This part 20.4 interlockingly engages, viewed in the measuring direction X, an intermediate part 20.5 which in turn interlockingly engages the cutout 21 formed on the housing 1. The intermediate part 20.5 is fixed in place on the housing 1 by a screw 24. Part 20.4 is also mounted on block 20.5 by the screw 24. In this preferred embodiment surfaces extending transversely with respect to the measuring direction X cooperate in order to achieve an interlocked connection between the mounting block 5 and the housing 1, which arrests and fixes the mounting block 5 in place together with the housing 1 in the measuring direction X.

Figure 11:
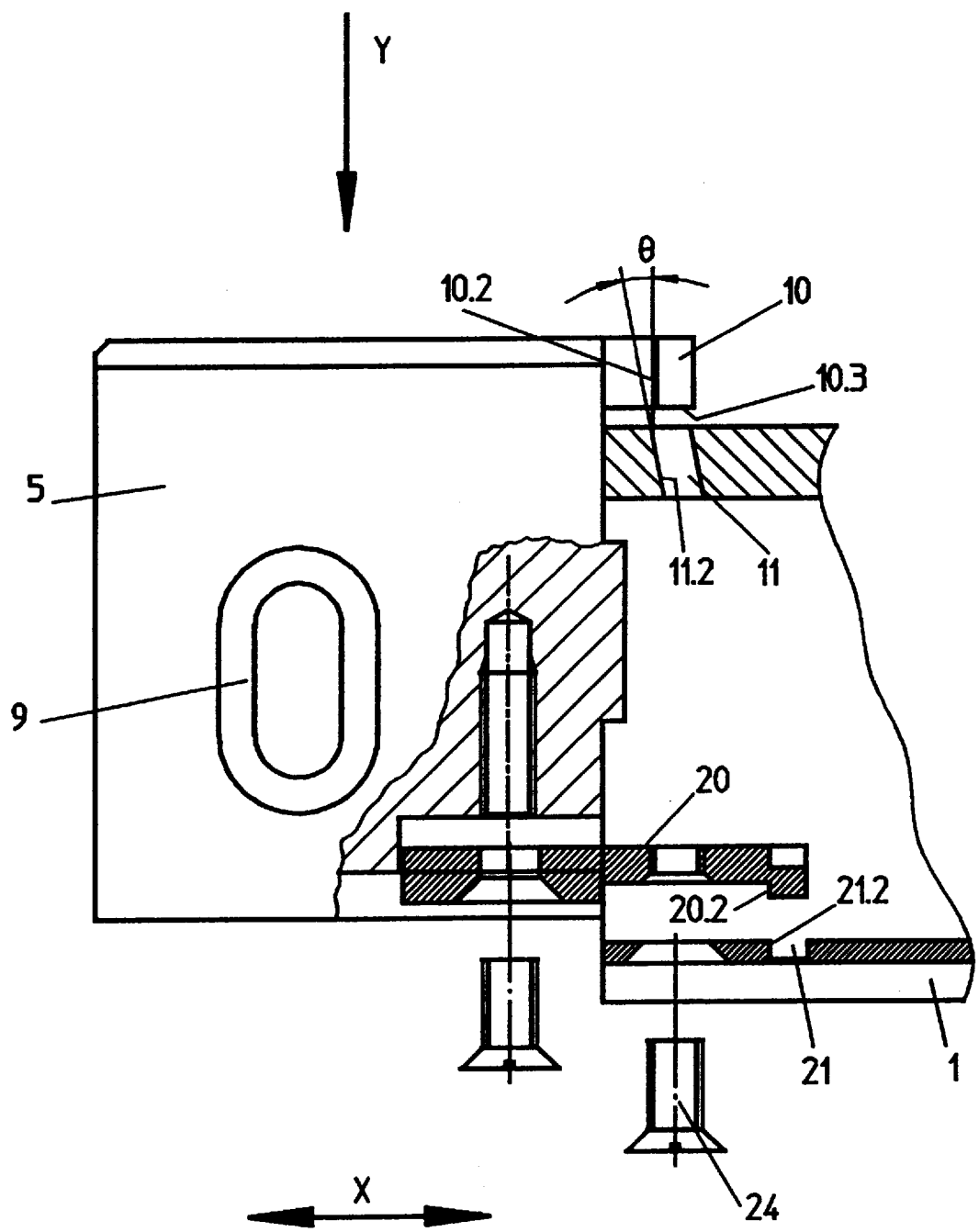
FIG. 11 is a cross-sectional view of a fifth length measuring device according to a preferred embodiment of the present invention.

FIG. 11 is a cross-sectional view of a fifth length measuring device according to a preferred embodiment of the present invention. The inserting element 10 is preferably formed as one piece on the mounting block 5 and cooperates with the cutout 11 in the housing 1 in accordance with the previously described embodiments. The second inserting element 20 is screwed to the mounting block 5 and has a protrusion with a surface 20.2, which extends transversely with respect to the measuring direction X and which cooperates with a corresponding surface 21.2 of the housing 1 in order to fix the mounting block 5 interlockingly in place on the housing 1. For security, a screw 24 can be additionally provided, which is screwed transversely with respect to the measuring direction X through the housing 1 and the second inserting element 20.

Figure 12:
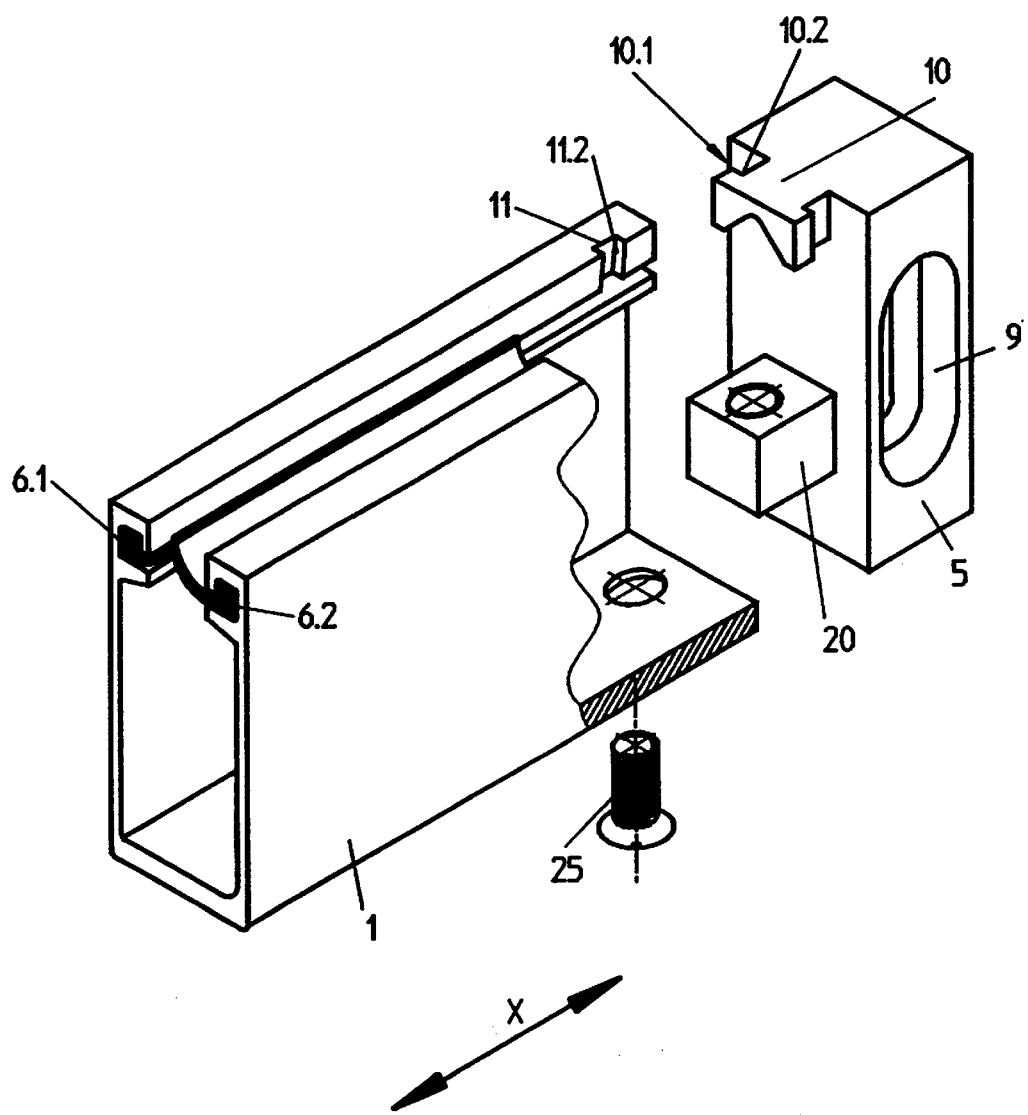
FIG. 12 is a schematic of a sixth length measuring device according to a preferred embodiment of the present invention.
Figure 13:
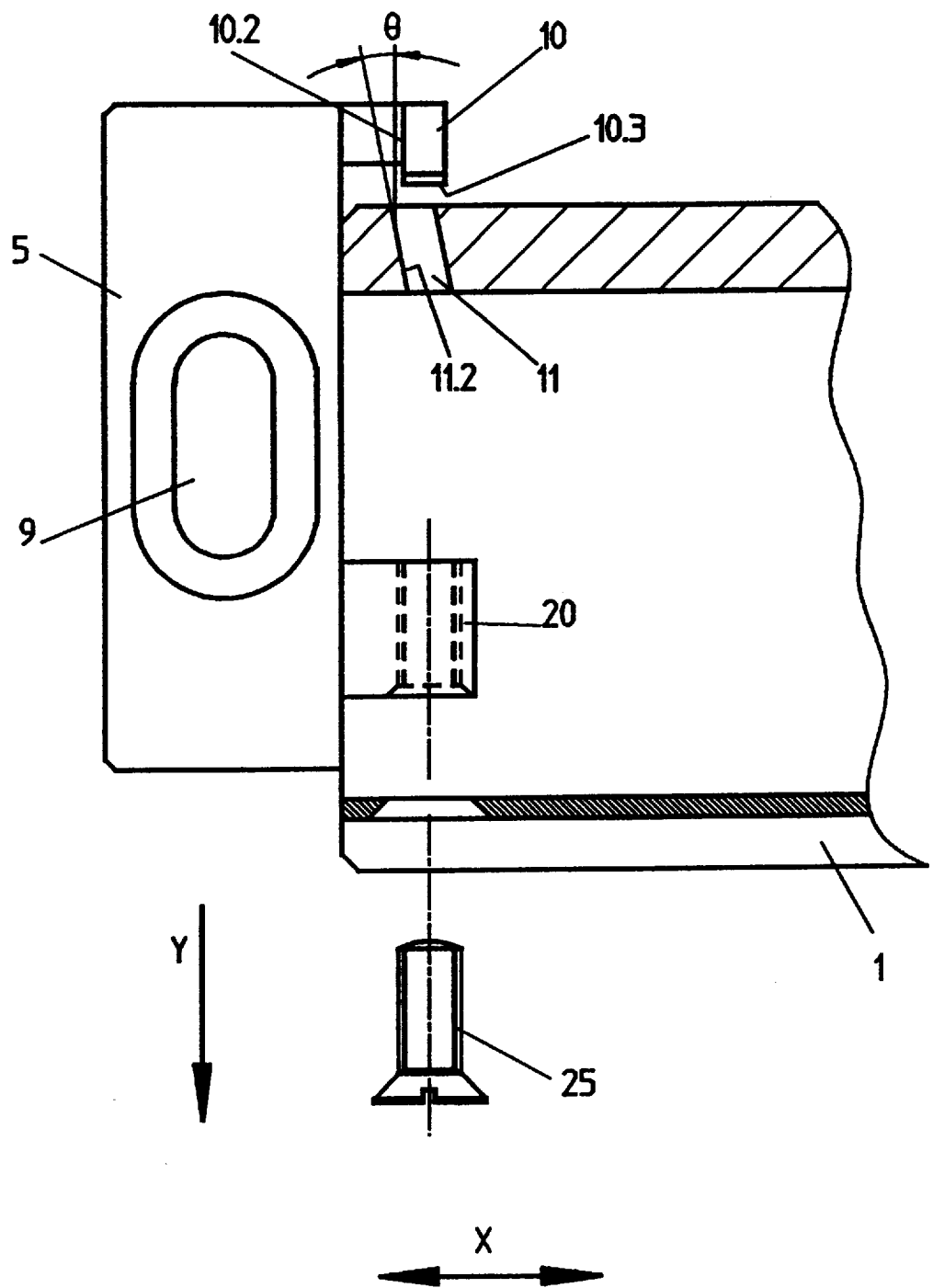
FIG. 13 is a cross-sectional view of the measuring device shown in FIG. 12.

FIG. 12 is a schematic of a sixth length measuring device according to a preferred embodiment of the present invention. FIG. 13 is a cross-sectional view of the device shown in FIG. 12. In this preferred embodiment the inserting element 10 and the cutout 11 are embodied in the same way already described. A safety is provided in addition in the form of the second inserting element 20. The second inserting element 20 is formed as a protrusion on the mounting block 5 and has a bore extending transversely with respect to the measuring direction X. A corresponding bore is provided in the housing 1, through which the inserting element 20 is screwed together with the mounting block 5 transversely with respect to the measuring direction X by a screw 25.

Figure 14:
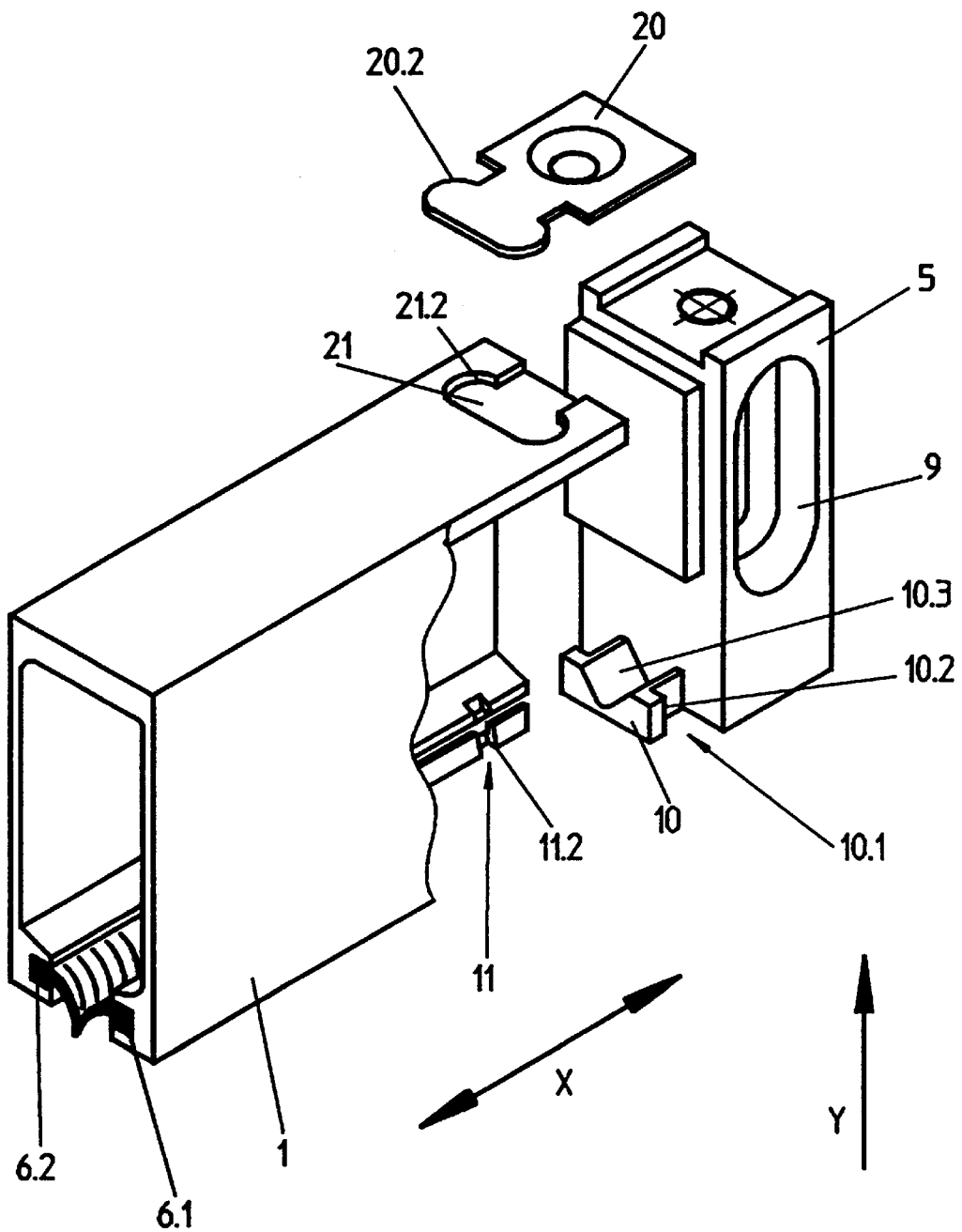
FIG. 14 is a schematic of a seventh length measuring device according to a preferred embodiment of the present invention.

FIG. 14 is a schematic of a seventh length measuring device according to a preferred embodiment of the present invention, the mounting block 5 and housing 1 are shown upside down with respect to the previous embodiments. A second inserting element 20 preferably in the form of a plate, is screwed to the mounting block 5 and interlockingly engages a cutout 21 formed in the bottom of the housing 1. Fixation in place transversely with respect to the measuring direction X is provided by the surfaces 20.2 and 21.2 of the second inserting element 20 and cutout 21 respectively. The inserting element 10 and the cutout 11 are designed in accordance with the previously described preferred embodiments.

In all of the preferred embodiments, which utilize screw connections extending transversely with respect to the measuring direction X, it is advantageous to replace these, too, by an interlocked connection so that surfaces which extend transversely with respect to the measuring direction X of the part to be connected, such as the mounting block 5, inserting element 10 or 20, housing 1 and intermediate elements 20.4 or 20.5, cooperate.

With all of the preferred embodiments a sealing material, for example a sealing disk or a sealing ring, can be included for the secure sealing between the front end of the housing 1 and the mounting block 5.

It is advantageous in connection with all of the preferred embodiments if only cutouts 11, 21 are provided on the housing 1. In this way it is possible to use a cost-effective profile as the housing 1, which is simply cut to size in accordance with the required measuring length and into which the cutouts 11, 21 are made later in a simple manner. It is also assured by this step that the scanning unit 4 can be easily inserted at the front end of the housing 1 which makes an easy exchange or replacement of the scanning unit 4 possible.

Other mounting possibilities in place of the mounting opening 9 on the mounting block 5 can be provided in a manner not represented. For example, an interlocked connection as described in U.S. Pat. No. 4,649,648 can be used. It can be practical in connection with longer housings to provide further fastening points. These fastening points should be made interlocking in order to assure that in case of temperature changes the housing 1 follows the expansion of the first object to which it is mounted. This interlocked connection along the longitudinal extension of the housing 1 acts parallelly on the housing 1, i.e. in the measuring direction X. Each fastening point can consist of a spherically curved surface which is engaged by a conical socket.

What is claimed is:

1. A length measuring device having a scale extending along a measuring direction inside a tube-shaped housing having a first and a second end face along with a scanning unit which can be longitudinally displaced inside the housing for scanning the scale, wherein each one of the first and second end faces of the housing is closed off by a mounting block which fastens the housing on an object, the device comprising:

at least one inserting element coupled to the mounting block;

at least one cutout formed in the housing wherein the at least one inserting element engages the at least one cutout to interlockingly fix the mounting block in place with respect to the housing in the measuring direction.

2. A device according to claim 1 wherein the at least one inserting element is integrally formed as part of the mounting block.

3. A device according to claim 1 wherein the at least one inserting element is formed by a separate element that is coupled to the mounting block.

4. A device according to claim 3 wherein the at least one inserting element is coupled to the mounting block by a screw.

5. The device according to claim 1 wherein the inserting element has a protrusion with a cutout having two surfaces, which extend transversely with respect to the measuring direction, and which cooperate in an interlocking manner with surfaces of the cutout of the housing which also extending transversely in respect to the measuring direction.

6. The device according to claim 1 wherein the cutout in the housing extends transversely with respect to the measuring direction and forms a guide for the inserting element.

7. The device according to claim 3 wherein the housing has a slit extending in the measuring direction which is sealed by a sealing element to form a sealed hollow chamber of the housing wherein the cutout is arranged outside of the sealed hollow chamber of the housing.

8. The device according to claim 1 wherein the housing has a slit extending in the measuring direction forming a first and a second leg of the housing which extend on both sides of the slit, wherein the cutout extends transversely with respect to the measuring direction and is formed in each one of the first and second legs, each one of which is interlockingly engaged by the at least one inserting element, wherein the interlocked connection acts in the measuring direction as well as in at least one direction extending transversely to the measuring direction.

9. The device according to claim 5 wherein at least one of the two surfaces is inclined at a small angle ($\theta$) with respect to the normal direction of the measuring direction (X) in such a way that, when the inserting element is hooked in and the mounting block is forced against the surface to be sealed at the front of the housing by the cooperation of the two surfaces.

10. The length measuring device according to claim 4 wherein the inserting element has a surface which extends transversely with respect to the measuring direction (X) and is in contact with the sealing element.

11. The length measuring device according to claim 1 wherein several inserting elements are provided at the mounting block, which interlockingly engage cutouts of the housing.

12. The length measuring device according to claim 11 wherein one of the inserting elements is seated, pivotable or displaceable in the measuring direction on the mounting block and that by the displacement of the inserting element bracing is achieved between the mounting block and the housing which acts in the measuring direction (X).

13. The length measuring device according to claim 12 wherein the inserting element has a protrusion which engages the cutout of the housing and constitutes an interlocked connection acting transversely in respect to the measuring direction (X).

14. The length measuring device according to claim 13 wherein the protrusion is a cupped gripping point.

15. The length measuring device according to claim 1 wherein a surface is arranged on the mounting block which cooperates with a surface of the housing and constitutes an interlocked connection acting transversely in respect to the measuring direction (X).

16. The length measuring device according to claim 1 wherein an electrically conductive element is attached to the mounting block which makes an electrical contact between the scale and the mounting block.

17. The length measuring device according to claim 16 wherein the contact element is a resilient element which resiliently rests on an electrically conductive surface of the scale.

18. A method for mounting a length measuring device having a tube-shaped housing with a scale, the method comprising the steps of:

mounting a mounting block on an opening in the front end of the housing in accordance with the following method step: hooking of an inserting element disposed on the mounting block into a cutout extending transversely in respect to the measuring direction (X), and movement of the mounting block transversely in respect to the measuring direction (X).

19. The method in accordance with claim 18, characterized in that in the course of the movement of the mounting block transversely in respect to the measuring direction (X), a contact element applied to the mounting block is brought into electrically conducting contact with a surface of the scale.

* * * * *

UNITED STATES PATENT AND TRADEMARK OFFICE
CERTIFICATE OF CORRECTION

PATENT NO. : 5,832,616
DATED : November 10, 1998
INVENTOR(S) : Karl Fiedler

It is certified that error appears in the above-identified patent and that said Letters Patent is hereby corrected as shown below:

<u>Title page,</u>
Item [73], please change "Heindenhain" to -- Heidenhain --.

<u>Column 8,</u>
Line 61, please change "extending" to -- extend --.

Signed and Sealed this

Eleventh Day of November, 2003

JAMES E. ROGAN
*Director of the United States Patent and Trademark Office*